United States Patent
Rex

(10) Patent No.: US 6,814,891 B1
(45) Date of Patent: Nov. 9, 2004

(54) CONDUCTIVE MOLDING COMPOSITIONS AND ARTICLES MOLDED THEREFROM

(75) Inventor: Gary Charles Rex, Sissonville, WV (US)

(73) Assignee: Union Carbide Chemicals & Plastics Technology Corporation, Danbury, CT (US)

(*) Notice: Subject to any disclaimer, the term of this patent is extended or adjusted under 35 U.S.C. 154(b) by 0 days.

(21) Appl. No.: 09/913,771
(22) PCT Filed: Feb. 18, 2000
(86) PCT No.: PCT/US00/04262

§ 371 (c)(1),
(2), (4) Date: Feb. 8, 2002

(87) PCT Pub. No.: WO00/49076

PCT Pub. Date: Aug. 26, 2000

Related U.S. Application Data

(60) Provisional application No. 60/120,677, filed on Feb. 19, 1999.

(51) Int. Cl.$^7$ ............................ H01B 1/04; H01B 1/20; C08K 3/04; C08L 67/06; B29C 35/08
(52) U.S. Cl. .................... 252/511; 252/502; 252/510; 524/404; 524/495; 524/496; 4/170; 264/460; 264/464; 264/478; 264/494
(58) Field of Search .................. 252/511, 502, 252/510; 524/404, 495, 496; 525/170; 264/460, 463, 464, 478, 494

(56) References Cited

U.S. PATENT DOCUMENTS

| | | | |
|---|---|---|---|
| 4,172,059 A | 10/1979 | Atkins et al. | 260/22 |
| 4,374,215 A | 2/1983 | Atkins | 523/514 |
| 4,525,498 A | 6/1985 | Atkins et al. | 523/511 |
| 4,755,557 A | 7/1988 | Atkins et al. | 525/27 |
| 4,942,001 A | 7/1990 | Murphy et al. | 264/22 |
| 5,371,134 A | * 12/1994 | Inoue | 524/495 |
| 5,401,803 A | * 3/1995 | Rex | 525/170 |
| 5,434,220 A | * 7/1995 | Yoshimura et al. | 525/92 D |
| 5,547,609 A | * 8/1996 | Fujii et al. | 252/511 |
| 5,589,538 A | * 12/1996 | Rex et al. | 525/28 |
| 5,614,581 A | * 3/1997 | Cobbledick et al. | 524/495 |
| 5,707,699 A | * 1/1998 | Miyakawa et al. | 428/35.7 |
| 5,811,478 A | * 9/1998 | Rex et al. | 524/115 |
| 5,843,340 A | * 12/1998 | Silvi et al. | 252/511 |
| 5,869,557 A | * 2/1999 | Landru et al. | 524/399 |
| 6,001,919 A | * 12/1999 | Yen et al. | 524/496 |

FOREIGN PATENT DOCUMENTS

| | | | | |
|---|---|---|---|---|
| JP | 58-176224 | * 10/1983 | | C08J/7/04 |
| JP | 61-049823 | * 3/1986 | | B29C/47/00 |
| JP | 08-283584 | * 10/1996 | | C08L/101/00 |

OTHER PUBLICATIONS

Data sheets on Carbon Blacks from Degussa corp, 2–sheets, No date.*
Data Sheets on Carbon Black from Reade Advanced Materials, 2–Pages, 1997.*

* cited by examiner

*Primary Examiner*—Mark Kopec
*Assistant Examiner*—Kallambella Vijayakumar

(57) ABSTRACT

Electrically conductive, thermoset molding compositions are disclosed which comprise an unsaturated thermosetting resin, an olefinically unsaturated monomer which is copolymerizable with the thermosetting resin, a thermoplastic additive and carbon black. The carbon black is incorporated in a conductive additive which comprises the thermoplastic additive, the carbon black and, preferably, a lubricant. The electrical resistance of articles molded from the disclosed molding compositions is typically less than about $10^8$ ohms/cm$^2$.

13 Claims, No Drawings

CONDUCTIVE MOLDING COMPOSITIONS AND ARTICLES MOLDED THEREFROM

This application claims the benefit of provisional application No. 60/120,677 filed Feb. 19,1999.

FIELD OF THE INVENTION

The present invention relates to conductive, thermoset molding compositions and articles made therefrom. More specifically, the present invention relates to molding compositions containing thermoplastic additives comprising conductive carbon black which can impart electrical conductivity to articles molded from the molding compositions.

BACKGROUND OF THE INVENTION

Thermoset molding compositions are commonly used to make a variety of articles such as, for example, automotive body panels, truck cab components, appliances, home furnishings, e.g., bathtubs, doors, and the like. Such molding compositions typically comprise an unsaturated thermosetting resin, an olefinically unsaturated monomer which is copolymerizable with the thermosetting resin, a thermoplastic additive, fibrous materials, and various other ingredients, including for example, fillers, mold release agents, and the like.

In some cases, the molding compositions comprise a pigment which imparts a desired color to the molded article. In other cases, the molded articles are painted in order to provide the desired color. Electrostatic spray systems are being used more frequently in the industrial application of primers and paints because of improvements in the transfer efficiency, that is, the amount of primer or paint deposited on the article versus the amount of primer or paint sprayed. In systems which do not utilize electrostatics spray processes, "bounce back" and "overspray" can reduce the transfer efficiency. Bounce back occurs as atomized droplets of paint approach the surface of the article and an air current rebounding from the same surface deflects the droplets into a new trajectory away from the article. Overspray occurs when a portion of the paint is sprayed beyond the article's edge into the surrounding space.

In electrostatic spray processes, atomized paint droplets are passed through an electric field charging the droplets. The droplets are drawn to the article to be painted which is at ground potential. If the article cannot conduct electric current, then the article becomes increasingly charged. This charge buildup on the articles' surface eventually repels new incoming charged droplets. This repulsion can lower the transfer efficiency quite dramatically. Therefore, it is highly desirable in electrostatic paint processes that the surface of the article be made conductive.

Both sheet molding compound ("SMC") and bulk molding compound ("BMC") are good insulators and have poor electrical conductivity. SMC and BMC molded articles can be made conductive by incorporating a conductive material, e.g., carbon black, into the molding composition or by applying a conductive coat (known in the art as a "dust coat") on the molded article. The incorporation of carbon black in its neat form into molding compositions is generally undesired in the art because handling carbon black presents significant housekeeping problems and health concerns. Applying a dust coat is also generally undesirable because it adds an additional step to the painting process which often increases costs.

Accordingly, improved molding compositions are desired to provide electrically conductive molded articles which are suitable for electrostatic painting. Desirably, the improved molding compositions would allow molders of articles to avoid the necessity of handling neat carbon black and avoid the use of a dust coat in the electrostatic painting process.

SUMMARY OF THE INVENTION

By the present invention, improved molding compositions suitable for manufacturing electrically conductive articles are provided. As a result, articles molded from the molding compositions of the present invention can be painted by electrostatic painting processes which can lead to enhancements in the transfer efficiency of the paint to the article, i.e, a reduction in bounce back and overspray and a corresponding reduction in the amount of volatile organic compounds released to the environment.

In accordance with the present invention, electrically conductive, carbon black is incorporated into compositions comprising a thermoplastic polymer (hereinafter referred to as "conductive additive"). The conductive additives are preferably prepared in the form of pellets or extrudate prior to their addition to the molding compositions. Quite advantageously, the incorporation of the conductive carbon black into the conductive additive avoids the necessity of handling carbon black in its neat form. Also, the amount of carbon black introduced into the molding compositions can be more accurately controlled.

Quite surprisingly, it has been found in accordance with a preferred aspect of the present invention that by adding a lubricant, e.g., zinc stearate, during the manufacture of the conductive additives, the electrical conductivity of the conductive additive and the resulting molding composition in which it is incorporated, and articles molded therefrom, can be enhanced.

DETAILED DESCRIPTION OF THE INVENTION

The carbon black suitable for use in accordance with the present invention can be any carbon black material which conducts electricity. Typically, the conductive carbon black will be in aggregate form, such aggregates having a particle size of from about 10 nanometers ("nm") to 75 nm, preferably about 15 to 40 nm, and more preferably about 20 to 30 nm. A typical aggregate of carbon black comprises a cluster, or bunch of particles ranging from about 1 micron ("$\mu$m") to 10 $\mu$m. Desirably the aggregates are touching or in close proximity to another aggregate in order for electrons to flow, known in the art as "tunnelling". Without being bound to any particular theory, this is believed to be fundamental to the mechanism of electrical conductivity. The surface area of the carbon black particles typically ranges from about 80 meters squared per gram ("$m^2/g$").to 1400 $m^2/g$ preferably from about 130 to 1300 $m^2/g$ and more preferably from about 600 to 1,000 $m^2/g$.

The carbon black has a high pore volume if the aggregates comprise particles arranged in a highly branched structure. This is referred to in the art as a "high structure" and is very desirable for enhancing electrical conductivity. The degree of structure, low or high, is typically determined by the Di-butyl phthalate ("DBP") absorption value which has units of milliliters of DBP per 100 g carbon black ("ml/100 g carbon black"). Higher absorption of DBP means a higher structure. DBP absorption typically ranges from about 65 ml/100 g to 500 m/100 g, preferably from about 120 ml/100 g to 400 ml/100 g and more preferably from about 140 ml/100 g to 385 ml/100 g.

Furthermore, the surface chemistry, or % volatility, is important if maximum conductivity is to be achieved. The "% volatility" refers to the oxygen containing functional groups present at the surface of the carbon black. A high concentration of these organic, functional groups may act as a barrier to the electron tunneling effect. If the electron tunneling is essential for efficient conductivity, the % volatility should be minimized. The % volatility of carbon black can typically range as high as 22% to as low as 0.4%. Generally, carbon black with a % volatility of less than about 1.0% is desired. Carbon black suitable for use in accordance with the present invention is available, for example, from Akzo Nobel Chemicals of Dobbs Ferry, N.Y., Cabot Corp. of Billerica, Mass. and Degussa Corp. of Rochelle Park, N.J. Further details concerning the selection of carbon black are known to those skilled in the art.

The thermoplastic additives suitable for use in accordance with the present invention can be any materials which have the desired dimensional control effect, e.g., shrinkage control, on the molded article. Typical of such thermoplastic additives include for example, polystyrene, polyvinyl acetate homopolymers and copolymers, e.g., vinyl acetate copolymerized with acrylic acid, crotonic acid, vinyl chloride, polyurethanes, saturated straight-chain and cyclic polyesters, polyalkyl acrylates, or methacrylates and the like. Polyvinyl acetates and mixtures thereof with other thermoplastics are preferred thermoplastic additives for use in accordance with the present invention.

The weight average molecular weights of the thermoplastic additives of the present invention are from about 10,000 to 250,000, preferably from about 25,000 to 200,000 and more preferably from about 50,000 to 180,000 grams per gram mole ("g/g mole"). As used herein, the term "average molecular weight" means weight average molecular weight. Methods for determining weight average molecular weight are known to those skilled in the art. One preferred method for determining weight average molecular weight is gel permeation chromatography. The thermoplastic additives can be used in conjunction with lower molecular weight materials which can enhance their shrinkage control ability such as epoxys, lower reactivity secondary monomers and others. Examples of such approaches are disclosed in U.S. Pat. Nos. 4,525,498, 4,755,557, and 4,374,215.

One or more thermoplastic additives may be employed in the compositions of the present invention. Further details of the preferred thermoplastic additives suitable for use in accordance with the present invention are described, for example, in U.S. Pat. No. 4,172,059. Such thermoplastic additives are commercially available or alternatively can be prepared by those skilled in the art.

The lubricants suitable for use in the present invention can be any materials which are effective to enhance the electrical conductivity of the molded articles. Without being bound to any particular theory, it is believed that mechanical degradation of the carbon black aggregates can occur during the manufacture of the conductive additives, e.g., under the mixing shear and pressure that occurs, for example, during the melt extrusion of the thermoplastic additive with the carbon black. It is believed that such mechanical degradation can reduce the electrical conductivity of the conductive additives and hence, reduce the electrical conductivity of the articles molded from molding compositions comprising the conductive additives. Quite surprisingly in accordance with the present invention, it has been found that the incorporation of lubricants during the combination of the carbon black particles with the thermoplastic additive can enhance the electrical conductivity of the resulting conductive additives.

Preferably, the lubricants are selected from the group consisting of fatty acids and their metallic counterparts, for example, metallic stearates, polyalkylene glycols, polyalkylene oxides, detergents, phosphoric acid esters, polyether polyols, ethoxylated fatty acids, and mixtures thereof. Zinc stearate is an especially preferred lubricant for use in accordance with the present invention.

In making the conductive additives, the thermoplastic polymer or mixture of thermoplastic polymers is preferably combined, in a melted state, with the conductive carbon black and an effective amount of the lubricant in order to enhance the electrical conductivity of the conductive additive.

The conductive additive typically comprises from about 5 to 40, more typically from about 5 to 39, most typically from about 5 to 30, preferably from about 10 to 25 and more preferably from about 15 to 20 weight percent carbon black, typically from about 60 to 95, more typically from about 60 to 94, preferably from about 67 to 88 and more preferably from about 75 to 85 weight percent of the thermoplastic additive, and typically from about 0 to 35, more typically from about 1 to 10 preferably from about 2 to 8 and more preferably from 4 to 6 weight percent of the lubricant, said percentages based on the total weight of the conductive additive.

The conductive additive can be made by any technique which is effective to combine the carbon black, thermoplastic additive and lubricant. Typical techniques include for example, mixing, rolling and melt mixing via extrusion, with extrusion being preferred. Suitable extruders include for example, twin screw extruders available from Berstorff Corp. of Charlotte, N.C., Werner & Pfleiderer of Ramsey, N.J., or kneaders, available from Buss America of Bloomingdale, Ill. Further details concerning suitable extruders are known to those skilled in the art. The temperature at which the combination of ingredients is conducted depends, for example, on the particular thermoplastic additive used. Typically, the temperature will range from about 100 to 200° C. and preferably from about 130 to 160° C. The pressure under which the melt mixing is conducted is not critical. Typical pressures range from about 100 to 2,000, preferably from about 300 to 1,000 psia.

Preferably, the shearing which occurs during melt mixing, e.g., extrusion, is reduced by the presence of the lubricant in accordance with the present invention. Preferably, the conductive carbon black aggregates will be substantially free of mechanical degradation after extrusion. A convenient method for melt mixing in the laboratory is the use of a Brabender torque rheometer available from Brabender Company, South Hackensack, N.J. It is also a convenient way to measure Peak Torque. As used herein, the term "Peak Torque" means the highest torque reading indicated after the carbon black has been added to the polymer, measured at 160° C. and 60 revolutions per minute ("rpm") using a Brabender torque rheometer. It has been found in accordance with the present invention that the peak torque should be minimized during melt mixing and preferably should be less than about 1,000 Meter-gram ("M-g") and more preferably less than about 750 M-g.

The conductive additive may be prepared in any convenient form, e.g., as pellets, extrudate or spheres. Typically, the conductive additive is prepared as pellets having a size ranging from about 1.5 millimeters ("mm") to 4mm, and preferably from about 2 mm to 3 mm in diameter.

Further details on extrusion and other melt mixing techniques and effective conditions for making the conductive additives for use in accordance with the present invention are known to those skilled in the art.

The unsaturated thermosetting resins suitable for use in accordance with the present invention include those unsaturated polymeric materials which can be crosslinked to form thermoset articles. Typically, the unsaturated thermosetting resins have a weight average molecular weight of at least 500, preferably from about 500 to 10,000 g/g-mole.

Typical unsaturated thermosetting resins include, for example, epoxy diacrylates, polyester diacrylates, polyurethane diacrylates, acrylate capped polyurethane polyacrylates, acrylated polyacrylates, acrylated polyethers and the like. Especially preferred thermosetting resins include polyesters and vinyl esters. As used herein, the term "polyesters" also includes vinyl esters. Typically, the unsaturated thermosetting resins are; (i) a polyester resin comprising various combinations of anhydrides, such as maleic anhydride, and dicarboxylic acids, such as adipic acid or isophthalic acid, condensed with various diols such as propylene glycol, ethylene glycol, or 1,4-butanediol; or (ii) a vinyl ester resins comprising Novolac resins such as Derakane 780 or Bisphenol A based such as available from The Dow Chemical Company, Midland, Mich. Derakane 411-350. Such unsaturated thermosetting resins are commercially available or alternatively can be readily prepared by those skilled in the art. Examples of suitable unsaturated thermosetting resins for use in accordance with the present invention are described for example in U.S. Pat. Nos. 4,172,059 and 4,942,001.

One or more unsaturated thermosetting resins may be employed in the molding compositions of the present invention. The total amount of unsaturated thermosetting resins in the molding compositions of the present invention is typically from about 15 to 80 weight percent, preferably from about 20 to 60 weight percent, and more preferably from about 25 to 50 weight percent based on the weight of the unsaturated thermosetting resin, conductive additive and olefinically unsaturated monomer. Further details concerning the selection and amounts of unsaturated thermosetting resins are known to those skilled in the art.

The olefinically unsaturated monomers (also referred to herein as "crosslinking monomers") suitable for use in accordance with the present invention include materials which are copolymerizable with the unsaturated thermosetting resins. The monomer also serves the its interaction with the other components of the molding composition. Preferably, the olefinic unsaturation is due to ethylenic unsaturation. Typical olefinically unsaturated monomers include, for example, styrene, vinyl toluene isomers, methyl methacrylate, acryl nitrile and substituted styrene such as, for example, chlorostyrene and alphamethylstyrene. Multifunctional monomers, such as, for example, divinylbenzene or multifunctional acrylates or methacrylates may also be employed. Styrene is a preferred monomer for use in the compositions of the present invention.

One or more olefinically unsaturated monomers may be used in the molding compositions of the present invention. Typically, the total amount of the olefinically unsaturated monomers is from about 1 to 80 weight percent, preferably from about 5 to 50 weight percent, and more preferably from about 15 to 25 weight percent based on the weight of the unsaturated thermosetting resin, conductive additive and crosslinking monomer. Such monomers are readily commercially available. Usually, the thermosetting resins are dissolved in the olefinically unsaturated monomer to contain about 50 to 75 weight percent of the thermosetting resin. This is often done for ease of handling. Further details concerning the selection and amounts of the olefinically unsaturated monomers are known to those skilled in the art.

Typically, the total amount of the conductive additive in the molding compositions is from about 3 to 30 weight percent, preferably from about 5 to 25 weight percent and more preferably from about 8 to 20 weight percent based on the weight of the unsaturated thermosetting resin, conductive additive and crosslinking monomer.

Preferably, the total amount of carbon black in the molding composition is from about 0.1 to 10 weight percent, preferably from about 0.5 to 5 weight percent, and more preferably from about 0.5 to 1.5 weight percent based on the weight of the unsaturated thermosetting resin, thermoplastic additive and crosslinking monomer.

Reinforcements are also often employed in the molding compositions of the invention and can be, for example, any of those known to the art for use in molding compositions. Examples of such materials are glass fibers or fabrics, carbon fibers and fabrics, asbestos fibers or fabrics, various organic fibers and fabrics such as those made of polypropylene, acrylonitrile/vinyl chloride copolymer, and others known to the art. These reinforcing materials are typically employed percent, based on the total weight of the molding composition and preferably 15 to 50 weight percent.

The molding compositions of the invention may also contain one or more other conventional additives, which are employed for their known purposes in the amounts known to those skilled in the art, e.g., about 0.5 to 10 weight percent based on the total weight of the molding composition. The following are illustrative of such additives:

1. Polymerization initiators such as t-butyl hydroperoxide, t-butyl perbenzoate, benzoyl peroxide, t-butyl peroctoate, cumene hydroperoxide, methyl ethyl ketone peroxide, peroxy ketals, and others known to the art, to catalyze the reaction between the olefinically unsaturated monomer and the thermosetting resin. The polymerization initiator is employed in a catalytically effective amount, such as from about 0.3 to about 3 weight percent, based on the weight of the unsaturated thermosetting resin, conductive additive and crosslinking monomer.
2. Fillers such as clear, alumina trihydrate, silica, calcium carbonate, and others known to the art;
3. Mold release agents or lubricants, such as zinc stearate, calcium stearate, and others known to the art;
4. Viscosity reducing additives;
5. Thickeners, such as magnesium oxide, magnesium hydroxide, calcium oxide, calcium hydroxide, zinc oxide, barium oxide and mixtures thereof; and
6. Water.

The molding compositions of the present invention can be prepared by methods known to those skilled in the art, such as for example, mixing the components in a suitable apparatus such as Hobart mixer at temperatures on the order of about 20 to 50° C. The components may be combined in any convenient order. Generally, it is preferable that the thermosetting resin and conductive additive are added in liquid form by preparing a solution thereof in the crosslinking monomer. All the liquid components are then typically mixed together before adding the fillers, thickening agents and optional ingredients.

Once formulated, the molding compositions can be molded into thermoset articles of the desired shape, e.g., automotive fenders, hoods, appliances, bathtubs, doors, and the like. The specific conditions used in the molding process depend on the composition being molded as well as upon the nature of the particular articles desired, the details of which are known to those skilled in the art. Typical molding pressures for use in accordance with the present invention are from about 30 to 2,000 psia, preferably from about 100 to 1500 psia, and more preferably from about 200 to 1000 psia. Suitable molding temperatures are from about 80 to 180° C., preferably from about 100 to 160° C. and more preferably from about 120 to 150° C. Typical molding time periods range from about 0.5 to about 5 minutes or longer.

The molding compositions of the present invention are suitable for use, for example, as sheet molding compounds and bulk molding compounds. For example, sheet molding compound can be produced by laying down a first layer of the molding composition, i.e., paste, on a first layer of polyethylene film or the equivalent thereof, laying on this first layer of the paste filler reinforcements such as chopped glass fibers, and laying thereover a second layer of the paste. The two layers of the paste with the filler reinforcements sandwiched therebetween are then topped with a second sheet of polyethylene film and the resulting composite (sheet molding compound) is stored. Bulk molding compound can be produced by the use of sigma blade mixers, plow blade mixers, kneaders and the like. Further details concerning the manufacture, handling and use of sheet molding compounds and bulk molding compounds are known to those skilled in the art.

The articles molded from the molding compositions of the present invention typically have an surface resistivity of less than about $10^8$, preferably less than about $10^7$ and more preferably less than about $10^6$ to $10^4$ ohms per square centimeter (ohms/cm$^2$). Molded sheets of the conductive additive preferably, have a surface resistivity of less than about 10 ohms/cm$^2$ and more preferably less than about 5 ohms/cm$^2$. Techniques for measuring surface resistivity are known to those skilled in the art, see, for example ASTM procedure D257. As a result, the articles molded from the molding compositions of the present invention are particularly suitable to be coated, e.g., painted, by electrostatic painting processes. In comparison, the surface L resistivity of molded articles which do not comprise carbon black is typically greater than about $10^{12}$ ohms/cm$^2$. Details concerning electrostatic painting processes are known to those skilled in the art.

The following examples are provided for illustrative purposes and are not intended to limit the scope of the claims which follow.

Definitions

The following materials were used in the examples set forth below:

p-BQ—A five percent solution of parabenzoquinone in diallylphthalate.

Calcium Carbonate—A calcium carbonate filler having a particle size of 5 microns supplied by Georgia Marble of Kennesaw, Ga. and sold under the designation CalWhite II™.

PG 91148—A mixture of magnesium and calcium hydroxides dispersed in a low molecular weight polyester available from Plasticolors, Inc. of Ashtabula, Ohio Orthophthalic UPE—an unsaturated thermosetting resin (polyester) resin that is modified using typically 15–30 mole % orthophthalic acid substituted for maleic anhydride available from Ashland Chemical, Dublin, Ohio, as Q6710 (or MR 13031) and contains styrene monomer.

LPS—4015—A carboxylated poly(vinyl acetate), having a weight average molecular weight of about 75,000 to 100,000 g/mole available from Union Carbide Corp., Danbury, Conn.

zinc stearate—an internal mold release available from Synthetic products, Cleveland, Ohio.

VR-3—a fatty acid viscosity reducer available from Union Carbide Corporation, Danbury, Conn.

Conductive Carbon Black—A fine-particle form of microcrystalline carbon, available from Degussa Corp. of Rochelle Park, N.J.

tBIC—a peroxide initiator, t-Butyl-Isopropyl-Monoperoxy Carbonate, available from Atochem North America, Inc., Buffalo, N.Y.

DVB-CP—Chemically pure grade divinyl benzene available from Dow Chemical of Midland, Mich.

Styrene—an olefinically unsaturated aromatic monomer available from Ashland Chemical of Dublin, Ohio.

Modifier E—an inhibitor solution consisting 5% solution of p-benzoquinone in Diallyl phthalate available from Ashland Chemical of Dublin, Ohio.

Ionol—Butylated hydroxy toluene inhibitor available from Eastman Chemical Company of Kingsport, Tenn.

Byk 995—a proprietary viscosity reducer available from Byk Chemie of Canton, Ohio.

XVR-10—a thickening control agent comprising a liquid fatty acid available from Union Carbide Corp., Danbury, Conn.

General Procedure for Preparation of Bulk Molding Compound (BMC) Formulations

All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3–4 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent was mixed into the paste over a period of 2–3 minutes, the mixer was again stopped and ~175 grams of the paste were removed from the pan (using a large spatula) and transferred to a wide-mouthed 4 oz. Bottle. This paste sample was stored in the capped bottle at room temperature and the viscosity was measured periodically using a Model HBT 5× Brookfield Synchro-Lectric Viscometer on a Helipath Stand. Typical viscosities ranged from $10\times10^6$ to $80\times10^6$ centipoise ("cP").

After removal of the paste sample, the contents were reweighed and styrene loss made up, the chopped glass fibers were added slowly (from an ice cream carton) to the pan with the mixer running on slow speed. The mixer was run for ~30 seconds after all the glass was in the paste. This short time gave glass wet out without glass degradation. The pan was then removed from the mixer and separate portions of the BMC mix of ~450 grams each were removed using spatulas and transferred to aluminum foul lying on a balance pan (balance in the hood). The mix was tightly wrapped in the aluminum foil (to prevent loss of styrene via evaporation) and stored at room temperature until the viscosity of the retained paste sample reached molding viscosity. The weight of the BMC added to the foil varies with the molding application.

General Procedures for Preparation of Sheet Molding Compound (SMC) Formulations

All the liquid components were weighed individually into a 5 gallon open top container placed on a Toledo balance.

The contents of the container were the mixed (in a hood) with a high speed Cowles type dissolver. The agitator was started at a slow speed, then increased to medium speed to completely mix the liquids over a period of 2–3 minutes. The mold release agent and/or fatty acid was next added to the liquids from an ice cream carton and mixed until completely dispersed. The filler was next added gradually from a tared container until a consistent paste was obtained and the contents were then further mixed to a minimum temperature of 32° C. The thickener was next mixed into the paste over a period of 2–3 minutes, the mixer was stopped and ~175 grams of the paste was removed from the container and transferred to a wide-mouthed 4 oz. Bottle. The paste sample was stored in the capped bottle at room temperature and the viscosity measured periodically using a Model HBT 5× Brookfield Synchro-Lectric Viscometer on a Helipath Stand.

The balance of the paste was next added to the doctor boxed on the SMC machine where it was further combined with fiber glass (~1" fibers). The sheet molding compound (SMC) was then allowed to mature to molding viscosity and then molded into the desired article.

Molding Facilities
18"×18"×0.120" Test Panels

Flat panels were molded on a 75 TON Queens Hydraulic press. The press contained a matched dye set of 18"×18" chrome plated molds. The female cavity was installed in the bottom and the male portion was at the top. Both molds were electrically heated and were controlled on separate circuits so that the molds could be operated at different temperatures. The top and bottom temperature was 148° C. The molding pressure which can be varied from 0–75 TON was run at 1000 psig. The cure time was 90 seconds and the closure speed was 12 inches/minute. The charge weight was 1200 grams. The molds did not contain ejector pins; therefore, the molded panel was removed with a rubber suction cup and the use of a stream of air. The panels were laid on a flat surface, weighted to keep them flat and allowed to cool overnight The electrical surface resistivity was measured with an Electro-tech Systems wide range resistance meter, model 872A that was equipped with a concentric electrical resistivity probe, model 803B. The measurements were performed in accordance with ASTM D 257. A surface resistivity measurement at 10 volts was made by placing the resistivity probe on the flat surface of a test panel. The decade switch of the resistance meter was adjusted to within the range of the analog meter. The surface resistivity, Ω/sq., (ohms per square centimeter), then was read directly. The reported surface resistivity values of Example 3 are an average of nine readings on each test panel.

EXAMPLE 1

Preparation of Conductive Additive

The Brabender Torque Rheometer is a machine able to simulate the hot melt mix conditions of a twin screw extruder and is capable of producing polymeric mixtures on a laboratory scale. Temperature, mix time, and rpm of the mixer can be varied as desired. The dependent variable, mixer torque, is indicated digitally and can be tracked via a strip chart recorder.

The LPS-4015 and zinc stearate were first weighed in the proper proportions to provide the compositions set forth in Table 1 and introduced into the Brabender mix chamber via a load funnel. The materials were mixed until the torque curve "lined out to insure a homogeneous dispersion. This torque value was recorded as the initial torque. The conductive carbon was added and the polymer peak temperature and the Peak Torque, the highest torque obtained, were recorded. The speed was adjusted after 5 minutes to 100 rpm. At a total mix time of 10 minutes, the mixing chamber was disassembled, the mixture was removed and allowed to cool. Table 1 displays the various compositions of the conductive additives.

TABLE 1

Brabender Hot Melt Mixing of Conductive Additives
Mix Conditions
Temperature - 160° C.
Initial RPM - 60 for 5 min.
Final RPM - 100 for 5 min.
Total Mix Time - 10 min.

|  | Conductive Additives, wt. % | | | | |
|---|---|---|---|---|---|
| Sample No. | 1 | 2 | 3 | 4 | 5 |
| LPS-4015 | 84 | 83 | 82 | 80 | 78 |
| Conductive Carbon Black | 16 | 16 | 16 | 16 | 16 |
| Zinc Stearate | 0 | 1 | 2 | 4 | 6 |

EXAMPLE 2

Preparation of Molding Compositions

Table 2 below shows the formulas used for examining the various compositions of conductive additives produced in Example 1.

TABLE 2

Formulations of Conductive Molding Compounds (weight part per 100 weight parts of Resin)

| Sample No. | 6 | 7 | 8 | 9 | 10 | 11 |
|---|---|---|---|---|---|---|
| Ortho Polyester Resin | 60 | 60 | 60 | 60 | 60 | 60 |
| Neulon Preblend T | 4 | 4 | 4 | 4 | 4 | 4 |
| DVB CP | 3.9 | 3.9 | 3.9 | 3.9 | 3.9 | 3.9 |
| styrene | 29 | 29 | 29 | 29 | 29 | 29 |
| Modifier E | 0.5 | 0.5 | 0.5 | 0.5 | 0.5 | 0.5 |
| Byk 995 | 3.3 | 3.3 | 3.3 | 3.3 | 3.3 | 3.3 |
| Ionol (10% in styrene) | 1 | 1 | 1 | 1 | 1 | 1 |
| XVR-10 | 2 | 2 | 2 | 2 | 2 | 2 |
| Conductive Additive #1 | 16 | — | — | — | — | — |
| Conductive Additive #2 | — | 16 | — | — | — | — |
| Conductive Additive #3 | — | — | 16 | — | — | — |
| Conductive Additive #4 | — | — | — | 16 | — | — |
| Conductive Additive #5 | — | — | — | — | 16 | — |
| LPS-4015 | — | — | — | — | — | 13.4 |
| Conductive Carbon Black | — | — | — | — | — | 2.6 |
| All above components mixed until conductive additive was dissolved | | | | | | |
| tBIC, phr | 2.2 | 2.2 | 2.2 | 2.2 | 2.2 | 2.2 |
| Zinc Stearate, phr | 2 | 2 | 2 | 2 | 2 | 2 |
| Calcium Carbonate, phr | 180 | 180 | 180 | 180 | 180 | 180 |
| PG 91148 | 16 | 16 | 16 | 16 | 16 | 16 |

1/2" chopped Fiberglass @ 15% by wt.

All parameters were kept constant except the conductive additive. Note that Sample 11 is the control where the conductive carbon was added directly to the resin formula and dispersed at that point. This conductive carbon was the same as in the conductive additives, but was not subjected to the high mix shear of the polymer melt and its degrading effects. Also, all components were pre-mixed until solids were dissolve/dispersed using a high shear Cowles blade. The polymerization initiator, tBIC, was added/mixed and then followed by the addition of zinc stearate. The paste was transferred to the Hobart mixer where calcium carbonate was added and mixed at high speed. The thickener, PG-91148, was added/mixed under medium speed. Finally 15 wt. % of fiberglass was added, mixed and wetted out under low speed. The molding compound was then weighed out to the specified value, wrapped and allowed to maturate for two days before molding.

EXAMPLE 3

Electrical Resistance Measurements

Panels made in accordance with the compounding procedure described above were molded and tested for electrical conductivity. The results of the characterization are set forth in Table 3.

Example 3 gives Peak Torque recorded during the mixing of the conductive carbon into the polymer melt. Sample 6, which contains the conductive additive where no zinc stearate was used as a processing aid, had the highest Peak Torque and as expected the highest surface resistivity. As one progresses from Sample 7 through Sample 10, the level of the processing aid, zinc stearate, increases, the Peak Torque decreases and the surface resistivity decreases as well. Sample 11 has no peak torque value because the conductive carbon black and the thermoplastic low profile additive were introduced directly into the molding formula. This is a best case condition that gave the least surface resistivity because the conductive carbon was not subjected to the mechanical degradation of the polymer melt mixing process. Indeed, the surface resistivity was found to be $1 \times 10^4$ ohms.cm$^2$, the lowest recorded.

TABLE 3

Surface Resistivity versus Peak Torque

| Sample No. | 6 | 7 | 8 | 9 | 10 | 11 |
|---|---|---|---|---|---|---|
| Peak Torque, meter$^2$/gram | 1250 | 950 | 748 | 698 | 680 | — |
| Surface Resistivity, ohms/cm$^2$ | $4.0 \times 10^5$ | $1.3 \times 10^5$ | $1.3 \times 10^5$ | $7.8 \times 10^4$ | $6.3 \times 10^4$ | $1 \times 10^4$ |

EXAMPLE 4

Electrostatic Painting of SMC Panels

SMC of a similar composition as the BMC panels described above were painted electrostatically in order to evaluate a conductive panel versus a non-conductive panel in the electrostatic and non-electrostatic painting processes.

In both processes an air assisted painting was used in the determination of transfer efficiency ("TE"). TE is defined as the percentage of solid coating material transferred to a substrate. TE can be determined if the values four major variables are known: line speed, target width, flow rate and total solids.

Line speed was determined by the movement of the application device (Nordson SCF AE-1) past the substrate. The spraymation moves the application device from left to right while valving open across the target. The movement of the device is a measure within the spraymation and electronically displayed in inches/minute.

Standardization is done manually by timing the movement of the spray device over a known distance, i.e. 24 inches, and manually calculated before each run.

Target Panel Width is merely the width of the SMC panel, 18 inches.

Flow Rate is the difference between two mass flow meters in a timed period to determine flow rate of the nozzles while the application device passed in front of the part. The UNICARB® system, available from Union Carbide Corporation, Danbury, Conn., which is based on the use of super critical carbon dioxide (CO2) as a solvent, was used in this experiment. To determine the $CO_2$ concentration a sample (Hoke) cylinder was used. The amount of total flow difference of the mass flow meters was then multiplied by the $CO_2$ concentration. This gave the volume of coating sprayed out of the application device during a timed interval. Mass flow is the calculated in /min. sprayed.

Total solids were determined by backing a 0.25 g–0.50 g sample of the coating in aluminum sample pans for 60 minutes at 110° C.

The TE was calculated as below:

Line Speed seconds ("s")/foot ("ft")×Panel Width (ft)×Flow Rate (g/s)×Total Solids=Solids Sprayed (g)

The tare weight (g) of the target panel is determined. The panel is then coated, baked and then weighed (Solids+Tare weight (g)). The amount of solids applied to the panel is then determined.

Solids Applied (g)=(Solids+Tare weight (g))−(Tare Weight (g))

TE (%)=(Solids Applied (g)/Solids Sprayed (g))×100

The first column of Table 4 shows the results of painting the panels electrostatically (ES). The TE of the conductive SMC panel is 44.4% versus that of the non-conductive SMC panel, 10.1%. The low TE of the non-conductive SMC panel appears to be the result of the charged paint droplets being repelled by the increasingly charged panel's surface, i.e., because the SMC is non-conductive a static charge cannot drain to ground fast enough to prevent charge accumulation. The next column is the non-ES painted panels and, as expected, the TE values are virtually the same for both types of SMC. However for the non-conductive, non-ES panel the TE is 33.3% or about 10% less than the conductive, ES painted panel.

TABLE 4

Transfer Efficiency Study of Painted SMC Panels

|  | Electrostatic | Non-Electrostatic (control) |
|---|---|---|
| Conductive | 44.4% | 33.3% |
| Non-Conductive | 10.1% | 34.4% |

In addition to the specific aspects of the invention described above, those skilled in the art will recognize that other aspects are intended to be included within the scope of the claims which follow.

I claim:

1. A process for making an electrically conductive composition comprising combining in an extruder a melted thermoplastic additive having a weight average molecular weight of from about 10,000 to 250,000 grams per gram mole with carbon black and from 1 to 10 weight percent of a lubricant based on the total weight of the thermoplastic additive, carbon black and lubricant, and extruding a mixture of components.

2. The process of claim 1 wherein the combining is conducted at a temperature of from about 100 to 200° C.

3. The process of claim 1 wherein the combining is conducted at a pressure of from about 100 to 2,000 psia.

4. The process of claim 1 wherein the combining is done under shearing conditions.

5. The process of claim 4 wherein the Peak Torque of the composition is less than about 100 M-g.

6. The process of claim 1 wherein the lubricant is selected from the group consisting of fatty acids and their metallic counterparts, polyalkylene glycols, polyalkylene oxides, detergents, phosphoric acid esters, polyether polyols, ethoxylated fatty acids and mixtures thereof.

7. The process of claim 6 wherein the lubricant is zinc stearate.

8. The process of claim 1 wherein the thermoplastic additive is present in an amount of about 60 to 94 percent by weight and the carbon black is present in an amount of about 5 to about 40 percent by weight, wherein the percentages are based on the total weight of the thermoplastic additive, carbon black and lubricant.

9. A process for preparing a molding composition which comprises contacting one or more electrically conductive compositions according to claim 1, one or more unsaturated thermosetting resins and one or more olefinically unsaturated monomers which are copolymerizable with the unsaturated thermosetting resins.

10. The process according to claim 9 wherein the electrically conductive composition and the unsaturated resin are contacted in liquid form.

11. The process of claim 10 wherein the electrically conductive composition and the unsaturated thermosetting resin ore dissolved in olefinically unsaturated monomers prior to contacting.

12. The process of claim 11 wherein the contacted solutions of electrically conductive compositions and the unsaturated thermosetting resins are mixed after contacting.

13. The process of claim 12 wherein fillers and thickening agents arc added after mixing the electrically conductive composition and unsaturated thermosetting resins.

\* \* \* \* \*